United States Patent [19]

Iyeta

[11] 4,136,884

[45] Jan. 30, 1979

[54] ELECTROMAGNET TYPE PICKUP DEVICE

[75] Inventor: Motoi Iyeta, Hamakita, Japan

[73] Assignee: Nippon Gakki Seizo Kabushiki Kaisha, Hamamatsu, Japan

[21] Appl. No.: 778,928

[22] Filed: Mar. 18, 1977

[30] Foreign Application Priority Data

Mar. 18, 1976 [JP] Japan .................................. 51-29548

[51] Int. Cl.[2] .......................... G11B 3/02; H04R 1/16

[52] U.S. Cl. ............................ 274/37; 179/100.41 K; 179/100.41 M

[58] Field of Search ................ 274/37; 179/100.41 K, 179/100.41 M

[56] References Cited

U.S. PATENT DOCUMENTS

| | | | |
|---|---|---|---|
| 2,955,216 | 10/1960 | Dieter | 179/100.41 K |
| 3,627,931 | 12/1971 | Matsuda | 179/100.41 M |
| 3,760,125 | 9/1973 | Laue | 274/37 |
| 3,908,096 | 9/1975 | Furuya | 179/100.41 K |
| 3,975,025 | 8/1976 | Obata et al. | 274/37 |

*Primary Examiner*—Steven L. Stephan
*Attorney, Agent, or Firm*—Cushman, Darby & Cushman

[57] ABSTRACT

An electromagnet type pickup device including a vibrating tubular member supporting a stylus-carrying cantilever and having a funnel-shaped engaging portion formed at one end, and including a tension wire having a bulging portion formed at one end, the other end being passed through the tubular member and secured thereto under tension so that the bulging portion is secured in said funnel-shaped engaging portion, thereby enhancing the firm engagement between the vibrating member and the supporting wire to establish the non-swaying center of vibration of the vibrating member.

8 Claims, 14 Drawing Figures

ELECTROMAGNET TYPE PICKUP DEVICE

BACKGROUND OF THE INVENTION (a) Field of the Invention

The present invention is concerned with an electromagnet type pickup device, and more particularly it pertains to a supporting means for supporting a cantilever in an electromagnet type pickup device.

(b) Description of the Prior Art

Among known electromagnet type pickup devices, those which have been put to practice widely are divided roughly into the two types: those of the moving magnet type as shown in FIG. 1, and those of the induced magnet type as shown in FIG. 2. Referring to FIGS. 1 and 2, a pickup structure comprises a stylus 1, a cantilever 2 for transmitting the vibrations detected by the stylus 1, a permanent magnet 3 for converting the mechanical vibrations into variations of magnetic flux, and a spacer 4 for supporting a vibrating assembly which is comprised of the stylus 1, the cantilever 2 and the premanent magnet 3, or a vibrating metallic element 7. The spacer 4 is formed of an elastic material for damping this vibrating assembly. Numeral 5 represents a yoke for detecting the vibrations of magnetic flux produced by the vibration of the vibrating element. Numeral 6 represents a coil wound around the yoke 5.

The pickup device having the aforesaid arrangement is simple in structure and is easy to manufacture as will be understood from FIGS. 1 and 2. In the arrangement of pickup device shown in FIG. 1, the cantilever 2 is secured through a spacer 4 to the yoke 5 directly or through a pole piece. Accordingly, when the permanent magnet 3 is put into vibration, it will be understood that, because of the fact that the frequency of the vibration extends in a wide range, the spacer 4 becomes deformed as shown in FIGS. 3 to 5, leading to the prominent drawback that the fulcrum of vibration becomes unstable. In FIGS. 3 to 5, numeral 7 is a tubular member for facilitating the replacement of the vibrating member.

In the reproduction of a stereophonic record disk, the vibrating element is subjected to vibrations in all directions relative to the fulcrum of vibration. Thus, the unstable movement, in the form of wave, of the fulcrum of vibration has been the cause of markedly deteriorating various characteristics such as localization characteristic of sound image, frequency characteristic, linearity characteristic and cross-talk characteristic, of the pickup device. Such deterioration has constituted a big problem especially in the reproduction of the recorded information in a high frequency band.

A further drawback of the known pickup device is noted in that, since the vibrating element, during operation, is continuously pulled in the direction of running sound groove due to the friction between the tip of the stylus and the sound groove of the disk, the fulcrum of vibration which is comprised of an elastic spacer 4 will be formed to move forwardly during the play and to move rearwardly when the play is brought to a halt. This friction which is developed between the sound groove and the stylus varies its magnitude according to the cut shape of the groove, i.e. modulated by the sound signal, and will induce back-and-forth vibrations of the vibrating element which is not only unnecessary but also harmful to the generation of electric signals required for the reproduction of a musical sound. This plus the previously mentioned unstable fulcrum of vibration further aggravate the desired various characteristics mentioned above. In order to eliminate the above-stated drawbacks of the prior art shown in FIGS. 1 and 2, there has been proposed an arrangement that a tension wire 8 is secured to a permanent magnet 3 to retain and prevent the permanent magnet 3 from being driven in the direction of run of the sound groove, as shown in FIGS. 6 and 7. A pickup device of this type has the drawbacks that the strength of fixation between the wire and magnet is not enough and also that the fulcrum of vibration of the permanent magnet 3 may move to a considerable extent toward the supporting wire 8 side in accordance with the vibrations of this permanent magnet 3. The tension wire 8 is either bonded under tension to the cantilever 2 or secured thereto under tension by caulking as shown in FIGS. 6 and 7. However, the bonding, under tension, of the supporting wire to an extremely limited area is difficult so that there arises a deficiency in mechanical strength. On the other hand, the tension wire could break at the site where it is caulked or there could arise an insufficient mechanical strength. As such, this prior technique is not desirable from the viewpoint of function of the pickup device.

As a means of clearly defining the portion which acts as the fulcrum and of eliminating the aforesaid drawbacks caused by the tension wire, there have been proposed an arrangement using a piano string inserted within the spacer, and an arrangement comprising a pair of spacer members: a relatively hard one and a relatively soft one, the hard one being disposed in the central portion and surrounded by the soft one. These arrangements have been put to practice, but they lack reliability and besides they have a further drawback that their constructions are complicated.

SUMMARY OF THE INVENTION

It is, therefore, a principal object of the present invention to eliminate the above-mentioned drawbacks of the pickup devices of the prior art, and to provide a structure for supporting the vibrating assembly, comprising a bulging member provided at one end of a tension wire which supports the vibrating assembly in such a way that the point of support of the assembly is positioned at the center of the fulcrum of the vibration to clearly and non-swayingly identify this fulcrum of vibration always throughout a wide band of vibration frequency. The present invention will be described in detail with respect to the preferred embodiments of the present invention by referring to the accompanying drawings.

BRIEF DESCRIPTION OF THE DRAWINGS

FIGS. 8 through 14 show the present invention, in which:

FIG. 8 is a diagrammatic explanatory illustration showing the manner in which one end of a tension wire is processed;

FIG. 9 is a diagrammatic sectional explanatory illustration showing the arrangement of a moving magnet type pickup cartridge embodying the present invention;

FIG. 10 is a diagrammatic exploded perspective view of the essential parts of the cantilever supporting means shown in FIG. 9;

FIG. 11 is a diagrammatic sectional illustration of the moving magnet type pickup cartridge, representing another embodiment of the present invention;

FIG. 12 is a diagrammatic exploded perspective view of the essential parts of the cantilever supporting means shown in FIG. 11;

FIG. 13 is a diagrammatic perspective view of the vibrating element shown in FIG. 11; and FIG. 14 is a diagrammatic explanatory illustration, showing the state of the fulcrum of the cantilever supporting means according to the present invention.

DETAILED DESCRIPTION OF THE PREFERRED EMBODIMENTS

Figure 1:
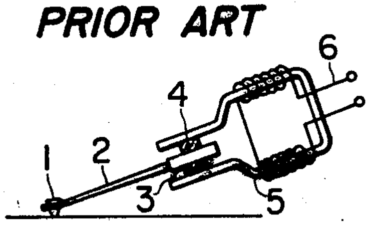
FIG. 1 PRIOR ART
FIGS. 1 and 2 are diagrammatic explanatory sectional illustrations showing the principles of the moving magnet type cartridge and the induced magnet type cartridge for use in pickup devices, respectively.
Figure 2:
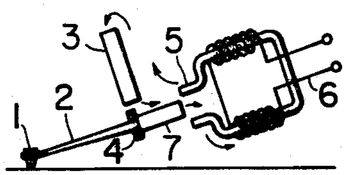
FIG. 2 PRIOR ART
Figure 3:
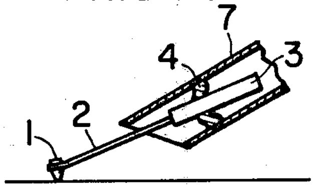
FIG. 3 PRIOR ART
FIGS. 3 through 5 are diagrammatic explanatory sectional illustrations showing the state of distortion of the damper in pickup devices having no tension wire, respectively.
Figure 4:
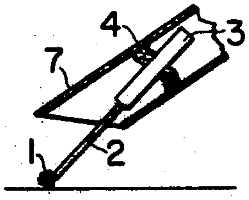
FIG. 4 PRIOR ART
Figure 5:
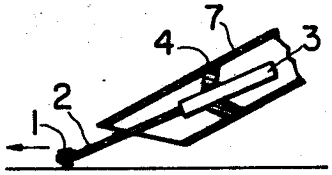
FIG. 5 PRIOR ART
Figure 6:
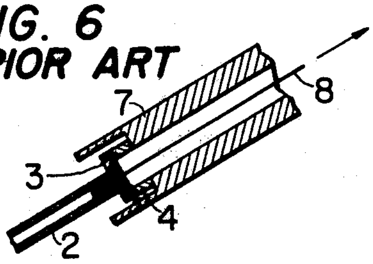
FIG. 6 PRIOR ART
FIGS. 6 and 7 are diagrammatic sectional illustrations of known arrangements of vibrating assemblies of cantilever having a tension wire.
Figure 7:
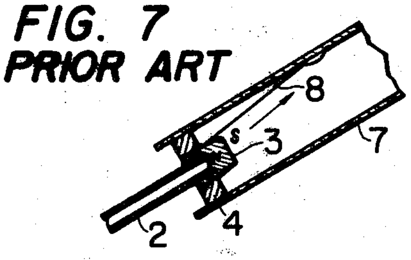
FIG. 7 PRIOR ART
Figure 8:
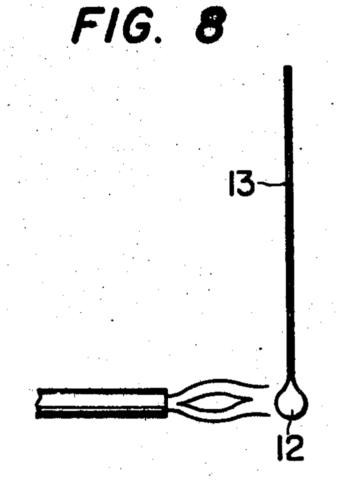

FIG. 8 shows a step of manufacture of a supporting member to be employed in the following embodiment. A tension wire 13 is made of a metal wire which in turn is formed of a platinum-nickel alloy and has a diameter of the order of 0.05 mm. One end of this tension wire is melted by an argon plasma flame in either a nitrogen gas atmosphere or an argon gas atmosphere into a bulging shape or sphere 12 having a diameter which is three to five times as large as the diameter of the tension wire 13. The temperature and the time required for forming the bulging portion are controlled to form the spherical member 12 accurately.

In case the tension wire 13 is made of iron or phosphor bronze, the formation of the spherical member 12 is carried out by the use of a hydrogen flame in either argon gas or nitrogen gas atmosphere. Also in case the tension wire 13 is made of, for example, beryllium or titanium, the formation of the spherical member is carried out by an electron beam in vacuum or by a laser beam in a gas atmosphere.

Figure 9:
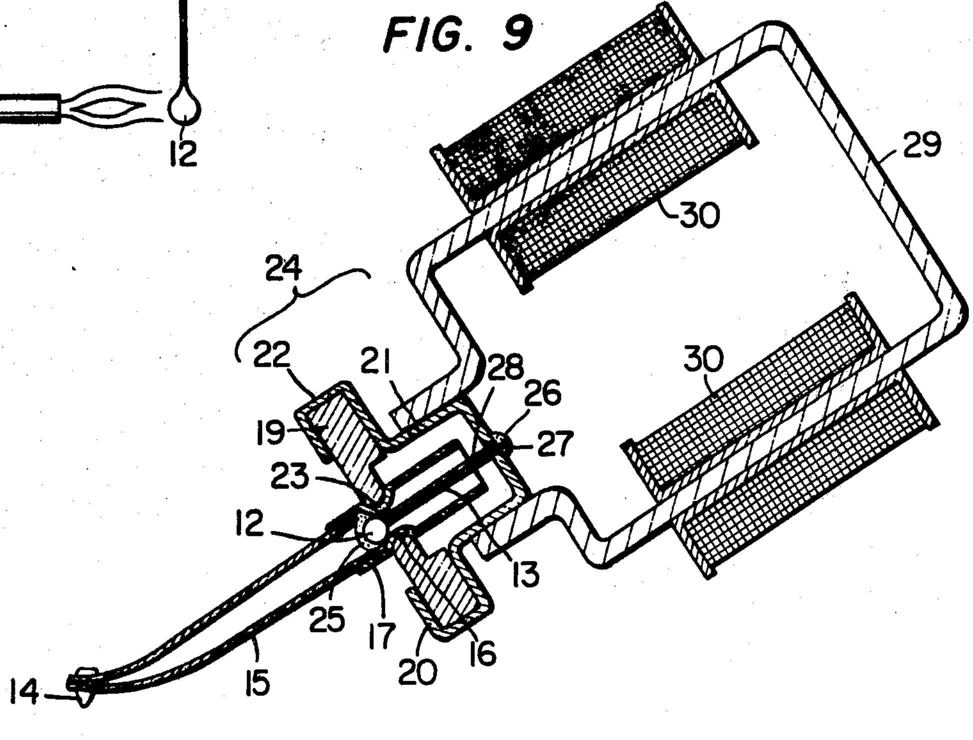
Figure 10:
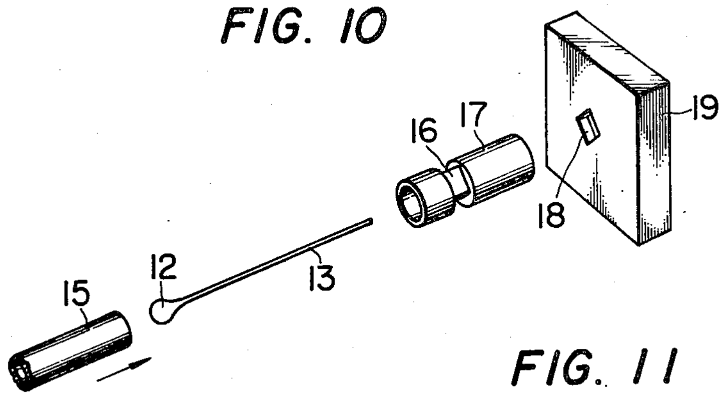

As shown in FIGS. 9 and 10, the tension wire 13 which is a metal wire having a spherical member 12 at one end, which has been formed in a manner stated above, constitutes a cantilever supporting means 24, jointly with: a vibrating element 17 which is a tubular member in which is received one end of a tubular cantilever 15 having a stylus 14 at the other end and which has a smaller diameter portion 16 of a certain shape centrally thereof and is made of a strongly magnetizable material and is magnetized in the longitudinal direction thereof; a square-shape damper 19 having a centrally locating small hole 18 having a shape and a size corresponding to those of the smaller diameter portion 16 of the vibrating element 17; and a pole piece 22 of an approximately T-shape having a damper holding frame portion 20 at one end and engaging portion 21 at the other end for engagement with a yoke 29.

More specifically, the aforesaid cantilever supporting means is assembled by first passing the tension wire 13 through the tubular vibrating element 17 from one end thereof and pulling this wire to cause the spherical member 12 which is formed at one end of the tension wire 13 to be firmly secured in the funnel-shaped smaller diameter portion or recessed portion 16 for firm engagement thereat, then bonding this engaging portion by the use of an appropriate bonding agent 25 with the wire 13 pulled under a predetermined tension, thereafter inserting the cantilever 15 into said one end of the vibrating element 17, followed by fixation of the overlapping portion with a bonding agent. Thereafter, the damper 19 is mounted on the cantilever-carrying vibrating element 17 in such a way that the peripheral edges 23 of the small hole 18 fit the smaller diameter portion 16 of the vibrating element 17. As shown in FIG. 9, the cantilever 15, the vibrating element 17, the tension wire 13 and the damper 19 are located substantially coaxially relative to each other. The resulting assembly is then attached to the pole piece 22 in such a way that the damper 19 is nipped by the damper holding frame portion 20. In this process, the other end of the tension wire 13 opposite to the one end provided with the spherical member 12 is passed through a hole 26 which is provided in the engaging portion 21 of the pole piece 22. The tension wire 13 is fixed to this engaging portion 21 by a bonding means 27 such as solder. Thus, the vibrating element 17 is pulled against the damper 19 under tension by means of the tension wire 13 to establish the non-swaying center of vibration of the vibrating element. In such an instance, the tension wire 13 may have been preliminarily covered with a tube 28 made of an organic material for the prevention of the development of resonance.

As shown in FIG. 9, the cantilever supporting means 24 which is arranged as stated above is attached, via the engaging portion 21 of the pole piece 22, between the terminal portions of the yoke 29 having coils 30 wound therearound, to thereby constitute an electromagnetic pickup of the moving magnet type.

Figure 11:
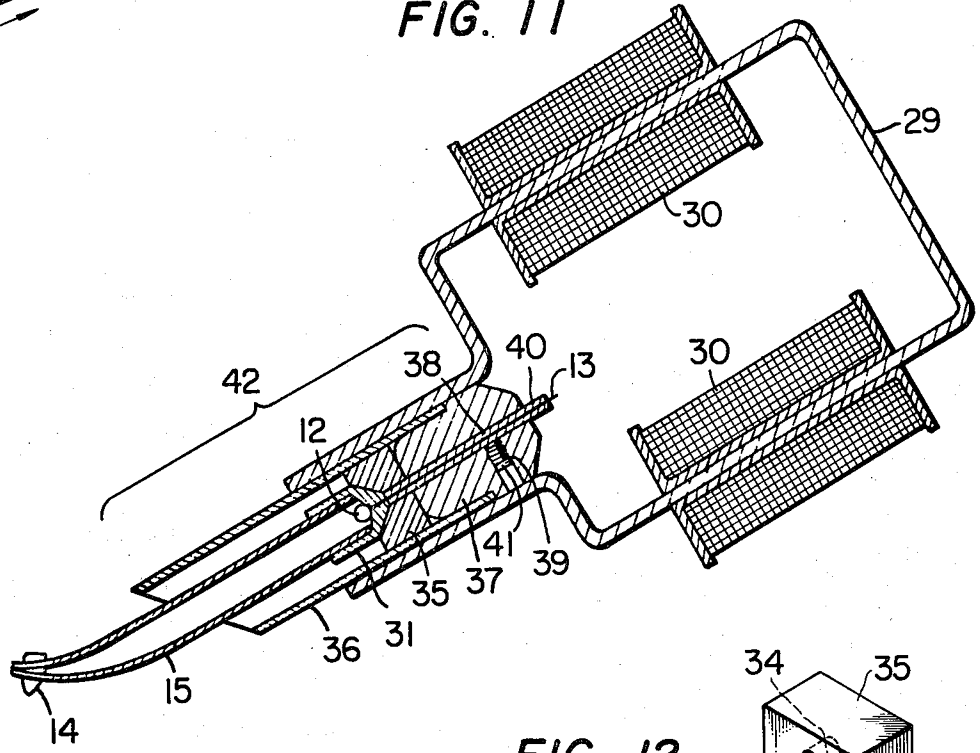
Figure 12:
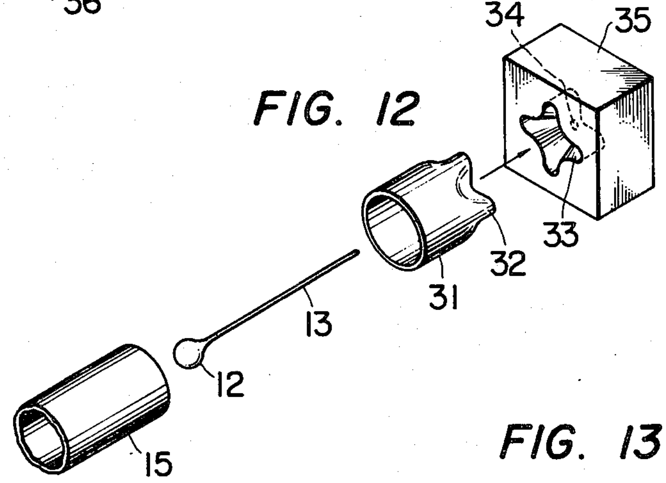

FIGS. 11 and 12 show a modification of the cantilever supporting means of the present invention. In these drawings, those parts indicated by the same reference numerals as those of FIGS. 9 and 10 represent the same arrangements.

Figure 13:
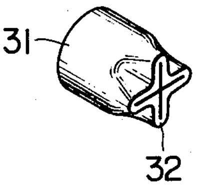

More particularly, one end of a tubular vibrating element 31 which is made of a strongly magnetizable material and magnetized in the longitudinal direction is formed in a cross shape as shown in FIG. 13, to construct a tension wire-receiving portion 32 for enhancing the engagement between the vibrating element 31 and a damper 35 and for preventing the undesired rotation of the vibrating element 31 relative to the damper 35. The other end of the tubular vibrating element 31 receives one end of the cantilever 15. The damper 35 is made of an elastic material and has a recessed portion 33 having a cross shape corresponding to the cross shape of the tension wire receiving portion 32 and having a small hole 34 located centrally of said recessed portion 33 for the insertion of the tension wire 13 therethrough. There is also prepared a pole piece 36 made of a square-shaped tubular member which, in turn, is made of a magnetic but non-magnetizable material. A plug member 37 is made of a non-magnetic material such as a synthetic resin and has a central through-hole 38 and a screw hole 39 which is formed at right angle relative to said through-hole 38. There are also prepared a tube 40 through which the tension wire 13 extends for the prevention of the occurrence of resonance of this tension wire, and a screw 41 to be screwed into said screw hole 39.

In this embodiment, as shown in FIG. 11, the tension wire 13 is passed through the vibrating element 31 from said the other end thereof, and is pulled until the bulging or spherical member 12 located at the other end of the tension wire 13 is abutted and securely posted at the tension wire receiving portion 32. Thereafter, a cantilever 15 is mounted in said the other end of the vibrating element 31 and secured thereat by means of a bonding agent. The tension wire receiving portion 32 of the vibrating element 31 now having the cantilever 15 is inserted in the recessed portion 33 of cross shape formed in one surface of the damper 35, and the tension wire 13 is pulled out from the small hole 34 of this damper. Then, this tension wire 13 is passed through the through-hole 38 of the plug member 37 via the tube 40 which is used for the prevention of resonance of the tension wire, in such a way that the tube 40 is allowed to slide within this through-hole 38.

Then, the screw 41 is screwed into the screw hole 39 of the plug member 37 to fix the tension wire 13 via said plug member 37 and said tube 40. The cantilever assembly thus arranged is then fixed in the pole piece 36 by, for example, the use of a bonding agent, via the plug member 37. The cantilever supporting means generally indicated at 42 which is arranged in the manner stated above is then nipped at its pole piece 36 between the yokes 29, to thereby constitute an electromagnetic pickup device of the moving magnet type.

Description has been made of the embodiments of the moving magnet type. In case it is intended to arrange the cantilever supporting means of the present invention into an electromagnetic pickup device of the induced magnet type, it is only necessary to construct the aforementioned vibrating element 17 or 31 either by pressing a mu-metal or by subjecting a mu-metal to a mechanical processing. Needless to say, in such a type as stated just above, a separate permanent magnet is provided.

Figure 14:
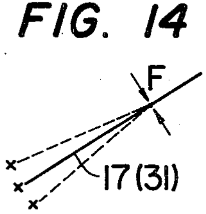

As explained above, a spherical member 12 which is formed at one end of a tension wire 13 is anchored under tension within a vibrating element 17 or 31, and a damper 19 or 35 is arranged at this anchor portion, i.e. at the fulcrum portion. Therefore, the fulcrum of vibration of the vibrating element 17 or 31 will be located on the longitudinal center line of such vibrating element 17 or 31 and also located only at the site of the bulging or spherical member 12. As such, the fulcrum F of vibration will never sway as shown in FIG. 14. Therefore, even when the vibrating element 17 or 31 vibrates in all directions, as shown by the broken lines, relative to the fulcrum F, the controlling effect exerted by the damper 19 or 35 will become extremely uniform, thus providing excellent reproduction and other desired characteristics.

As stated above, according to the present invention, a bulging or spherical member is formed at one end of a tension wire to utilize this spherical member to serve as an anchoring means to anchor a vibrating element relative to the tension wire, and a damper is arranged at the anchoring portion to insure that the fulcrum of vibration be constituted only by said anchoring portion. Thus, the fulcrum of vibration is made precise, and the mechanical strength of the supporting site is improved, and cross-talk and cross modulation distortion are minimized. Along therewith, it is possible to materialize a light-weight vibrating element, which leads to an improved frequency characteristic. Moreover, the attachment of a tension wire to a cantilever is performed with enough strength and precision, and is easily adjusted.

I claim:

1. An electromagnet type pickup device comprising:
a cantilever carrying a stylus at one end;
a vibrating element securely receiving the other end of said cantilever;
an elongated metallic member supporting said vibrating element under tension, said member comprising a first portion of a relatively small diameter and a teardrop-shaped second portion of a relatively large diameter which is integral with said first portion and formed by melting one end of said member to produce the teardrop shape, said second portion being securely received in said vibrating element and said first portion extending through and beyond said vibrating element in a direction opposite to said cantilever; and
means engaging said second portion to maintain the elongated member in tension.

2. An electromagnet type pickup device according to claim 1, in which said vibrating element has a recessed portion at one end thereof for receiving said cantilever and has a through-bore at the bottom of said recessed portion, the diameter of said through-bore being smaller than that of said second portion but larger than that of said first portion of the elongated member, and said second portion is received at the bottom portion of said recessed portion of the vibrating element in firm engagement with said bottom portion and said first portion extends under tension through said through-bore of the vibrating element.

3. An electromagnet type pickup device according to claim 2, in which said second portion of the elongated member abuts against and is anchored at the bottom portion of said recessed portion of the vibrating element.

4. An electromagnet type pickup device according to claim 1, further comprising a damper for supporting said vibrating element against said tension.

5. An electromagnet type pickup device according to claim 4, in which the other end of said vibrating element is formed in a cross-shaped configuration, and said damper has a cross-shaped recess to receive said the other end of the vibrating element.

6. An electromagnet type pickup device according to claim 4, in which said cantilever, vibrating element, elongated supporting member and damper are located substantially coaxially relative to each other.

7. An electromagnet type pickup device according to claim 1, further comprising a tube made of an organic material for substantially covering said first portion of the elongated member.

8. An electromagnet type pickup device according to claim 1, in which said vibrating element is made of a permanent magnetic material.

* * * * *